(12) United States Patent
Riera et al.

(10) Patent No.: US 9,560,876 B2
(45) Date of Patent: Feb. 7, 2017

(54) ACYLAMINO ACID COMPOUNDS AND FOOD PREPARATIONS CONTAINING SAME

(75) Inventors: Celine Riera, Lausanne (CH); Candice Menozzi, Pully (CH); Fabien Robert, Divonne les Bains (FR); Johannes Le Coutre, Pully (CH)

(73) Assignee: Nestec S.A., Vevey (CH)

( * ) Notice: Subject to any disclaimer, the term of this patent is extended or adjusted under 35 U.S.C. 154(b) by 1461 days.

(21) Appl. No.: 12/993,572

(22) PCT Filed: May 18, 2009

(86) PCT No.: PCT/EP2009/055970
§ 371 (c)(1),
(2), (4) Date: Feb. 9, 2011

(87) PCT Pub. No.: WO2009/141294
PCT Pub. Date: Nov. 26, 2009

(65) Prior Publication Data
US 2011/0129583 A1    Jun. 2, 2011

(30) Foreign Application Priority Data

May 20, 2008 (EP) .................................... 08156555
Jul. 4, 2008 (EP) .................................... 08159689

(51) Int. Cl.
*A23L 1/22* (2006.01)
(52) U.S. Cl.
CPC ..................................... *A23L 27/21* (2016.08)

(58) Field of Classification Search
CPC ..... A23G 3/343; A23G 3/346; A23G 2200/00; A23C 2250/054; A23C 19/082; A23C 19/0765; C07C 227/32; C07C 227/05; A23L 1/22; A23L 1/226; A23L 1/227
USPC .......... 562/534, 553, 568; 426/629, 534, 553
See application file for complete search history.

(56) References Cited

U.S. PATENT DOCUMENTS

| | | | |
|---|---|---|---|
| 3,766,085 A | * | 10/1973 | Fahnenstich et al. .. A23C 11/04 426/654 |
| 7,319,157 B1 | | 1/2008 | Chaudhuri et al. |
| 2005/0075368 A1 | * | 4/2005 | Dewis et al. ................. 514/330 |
| 2005/0233042 A1 | | 10/2005 | Galopin et al. |
| 2006/0014820 A1 | | 1/2006 | Burstein et al. |
| 2007/0112060 A1 | | 5/2007 | Chandran |
| 2007/0202188 A1 | | 8/2007 | Ley et al. |
| 2008/0200704 A1 | * | 8/2008 | Chaudhuri et al. .............. 554/35 |

FOREIGN PATENT DOCUMENTS

| | | |
|---|---|---|
| EP | 0432039 | 6/1991 |
| EP | 1356744 | 3/2011 |
| JP | 2008505868 | 2/2008 |

OTHER PUBLICATIONS

Altschul, A.M., "Fortification of foods with amino acids" Nature, vol. 248 (1974) 643-646.*
International Search Report for International Application No. PCT/EP2009/055970 mailed on Jul. 22, 2009.
(Continued)

*Primary Examiner* — Nikki H Dees
(74) *Attorney, Agent, or Firm* — K&L Gates LLP

(57) ABSTRACT

An acylamino acid compound is described which can be used in food preparations to generate a savory tingling sensation without burning effect.

8 Claims, 2 Drawing Sheets

(56) References Cited

OTHER PUBLICATIONS

Written Opinion for International Application No. PCT/EP2009/055970 mailed on Jul. 22, 2009.
Schiffman, Morch, "Taste of acetylated amino acids," Chemical Senses and Flavor, vol. 1, 1975, pp. 375-401; XP009108633.
Sugai, E., et al., "Pungent qualities of sanshool-related compounds evaluated by a sensory test and activation of rat TRPV1," Bioscience, Biotechnology and Biochemistry, vol. 69, No. 10, 2005, pp. 1951-1957, XP002503936.
Succar, R. et al., "Actions of N-arachidonyl-glucine in a rat inflammatory pain model," Aug. 30, 2007, Retrieved from the Internet: URL:http://www.molcularpain.com/content/3/1/24>, retrieved on Mar. 18, 2011, XP002503935.
Patent Database Chemistry (Mar. 2008, Updated 04), Selected Context Hit: 575 (of 773), Nov. 7, 2008, pp. 1-2, XP002503937.
Lapidot, Y., et al., "Use of esters of N-hydroxysuccinimide in the synthesis of N-acylamino acids," Journal of Lipid Research, vol. 8, 1967, pp. 142-145, XP002959794.
Burstein, S., et al., "Potential anti-inflammatory actions of the elmiric (lipoanimo) acids," Bioorganic & Chemical Chemistry, vol. 15, 2007, pp. 3345-3355, XP002503934.
Wang et al., "Microwave-Assisted Synthesis of Amide under Solvent-free Conditions", Synthetic Communications, 38: 1028-1035, 2008.
Baidya et al., "Synthesis and Pharmacological Screening of Some Indolizinamido Glutamine Amino Acid Derivatives", Indian Journal of Heterocyclic Chemistry, vol. 14, Jul.-Sep. 2004, pp. 81-82.
K. Albin, et al., "Modulation of Oral Heat and Cold Pain by Irritant Chemicals," Chem Senses, vol. 33, 2008, pp. 3-15.

\* cited by examiner (Z)-2-dodec-5-enamidoacetic acid
C-Gly (S,Z)-2-dodec-5-enamidopropanoic acid
C-Ala (S,Z)-2-dodec-5-enamidopentanedioic acid
C-Glu (S,Z)-2-dodec-5-enamido-3-hydroxypropanoic acid
C-Ser (S)-2-((9Z,12Z,15Z)-octadeca-9,12,15-trienamido)propanoic acid
Component K (S,Z)-2-hexadec-9-enamidopropanoic acid
Component J (S)-2-((2E,6Z)-dodeca-2,6-dienamido)propanoic acid
D-Ala

ACYLAMINO ACID COMPOUNDS AND FOOD PREPARATIONS CONTAINING SAME

FIELD OF THE INVENTION

The present invention relates to the culinary field. The present invention relates in particular to acylamino acid compounds or a salt thereof and their use in food preparations to generate a savory tingling sensation without burning effects. The present invention also relates to food preparations comprising an acylamino acid compound or a salt thereof.

BACKGROUND ART

Research on the molecular mechanisms underlying pungent sensations revealed the existence of two cation channels, TRPV1 (transient receptor potential V1) and TRPA1 (transient receptor potential A1) that are expressed in the somatosensory fibers innervating the oral cavity. TRPV1 is the receptor for heat and burning sensations such as capsaicin, the hot molecule in red hot chili peppers. TRPA1 responds to cold and pungent compounds such as allyl isothiocyanate (mustard oil) and cinnamaldehyde (cinnamon). At moderated concentrations, TRPA1 agonists exhibit a pleasant tingling sensation.

Capsaicin causes a burning sensation when it comes in contact with mucous membranes. Thus, it is commonly used in food products to give them added spice or pungency.

However, food products containing red chili peppers are frequently not accepted by the consumer as being too hot providing a very unpleasant mouth feeling. In particular, both the tingling and burning effect are considered to be very unsavory affecting the consumption of the food product.

It is therefore an object of the present invention to accommodate the needs of consumers which want to enjoy a spicy food without the interfering effect of burning sensations.

It is also an object of the present invention to provide a spicy food product which can be consumed without any side-effect such as burning sensations in the oral cavity.

SUMMARY OF THE INVENTION

Accordingly, this object is achieved by means of the features of the independent claims. The dependent claims further define preferred embodiments of the present invention.

The present invention describes, in a first aspect, fatty acid based acylamino acid compounds having the formula

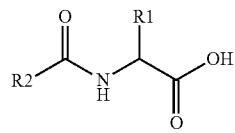

wherein R1 is selected from hydrogen, an alkyl group having 1 to 10 carbon atoms, a hydroxyalkyl group having 1 to 10 carbon atoms and a carboxyalkyl group having 1 to 10 carbon atoms and R2 is a straight chain hydrocarbon group having 5 to 20 carbon atoms and containing at least one double bond, or a salt thereof.

The compounds of the present invention generate new sensory properties. Diverse reactivity properties in vitro of these compounds have been found. More importantly, the acylamino acid compounds of the present invention exert a taste mainly tingling and not burning in the oral cavity when added to a food preparation.

Accordingly, the present invention relates to a food preparation comprising an acylamino acid compound or a salt thereof in amount sufficient to generate more tingling than burning sensations in the oral cavity.

The compounds of the present invention are major TRPA1 agonists which have only a minor effect on TRPV1.

The amount of tingling and/or burning sensations generated in the oral cavity can be determined by determining their stimulating effect on TRPA1 and TRPV1, respectively, as demonstrated in the present invention.

According to a second aspect of the invention, the present invention provides food preparations comprising an acylamino acid compound or a salt thereof sufficient to generate mainly tingling and not burning sensations in the oral cavity.

Finally, according to a third aspect of the invention, the amino acid compound or a salt is used for generating a mainly tingling and not burning sensation in a food preparation.

The invention will now be described in more detail by means of illustrative embodiments.

DETAILED DESCRIPTION OF THE PRESENT INVENTION

Figure 1:
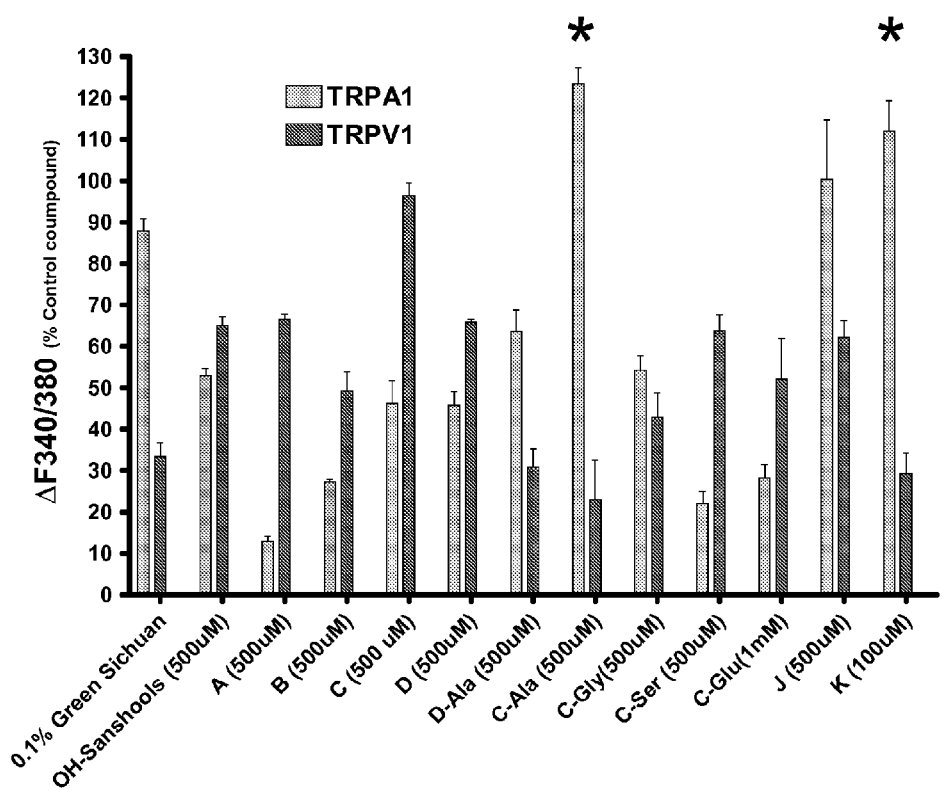
FIG. 1 shows a diagram illustrating test experiments using the compounds of the present invention on the ion channels TRPA1 and TRPV1.

The compounds of the present invention are products based on fatty acids and aminoacids which can be either naturally occurring or chemically modified. Both structural units are linked by a coupling reaction.

It is essential to the compounds of the present invention that at least one cis double bond is present in the straight chain hydrocarbon group having 5 to 20 carbon atoms. This structural feature induces reactivity on TRPA1 providing a mainly tingling taste. At the same time, TRPV1 is only moderately stimulated so that a burning sensation is substantially suppressed.

In a preferred embodiment of the present invention, the alkyl group in the above formula comprises 1 to 5 carbon atoms, more preferred 1 to 3 carbon atoms.

The compounds of the present invention comprise preferably 1 to 5 carbon atoms, more preferred 1 to 3 carbon atoms.

In a further preferred embodiment of the present invention, the carboxyalkyl group in the above formula comprises 1 to 5 carbon atoms, more preferred 1 to 3 carbon atoms.

It has been shown that the straight chain hydrocarbon group contained in the compounds of the present invention preferably comprises 10 to 18 carbon atoms, with 11 to 17 carbon atoms being preferred.

Particularly preferred examples of the acylamino acid compounds of the present inventions are those, wherein, in the formula, R1 is selected from hydrogen, methyl, hydroethyl and carboxylethyl and the straight chain hydrocarbon group comprises 11 carbon atoms.

The salts of the acylamino acid compounds of the present invention are preferably those usually used in the food industry. Examples for the salts are chlorides, sulfates, phosphates, gluconates, sodium, citrates, carbonates, acetates, lactates.

FIG. 1 shows a diagram illustrating test experiments using the compounds of the present invention on the ion channels TRPA1 and TRPV1.

The underlying experiment was performed as follows:
Cloning and Expression of Human TRPV1 and TRPA1 Receptors in HEK 293 Cells: Cloning and expression of these receptors was performed following previously published protocols. Briefly, cloned human TRPV1 cDNA was obtained from RZPD (Germany) and hTRPA1 cDNA from OriGene (Rockville, Md.). Genes were subcloned into pcDNA5/FRT (Invitrogen, Carlsbad, Calif.) to generate stable cell lines using the Flp-In system (Invitrogen) after sequencing verification.

Measurement of Intracellular Calcium Levels [Ca2+]i and Membrane Potential Variation in HEK 293 Cells Using a Fluorescent Plate Reader: Cell lines stably expressing TRP channels were seeded into 96-well plates previously coated with poly-D-lysine. Cells were incubated in Hank's Balanced Salt Solution (HBSS) supplemented with 2 mM CaCl2 and 20 mM HEPES (pH 7.4), containing the cytoplasmic calcium indicator Fura-2/AM at 2 µM (Molecular Devices, Sunnyvale, Calif.). Experiments were conducted at room temperature. [Ca2+]i fluxes from a homogeneous cell population (approximately 100000 cells) were measured as changes in fluorescence intensity when stimulated with agonists using a FLEXstation (Molecular Devices). Cells were then challenged with the different sanshool derivatives. Mock cells transfected with pcDNA5/FRT were used as negative controls. Cell viability was checked after alkylamide stimulation using 100 µM ATP.

Data Analysis: Responses of molecules in HEK 293 cells were expressed as a percentage of maximum responses evoked by 150 µM cinnamaldehyde for TRPA1 and 1 µM capsaicin for TRPV1 (these concentrations were assessed independently to be saturating under these conditions). For all experiments, calcium fluxes were measured as changes in fluorescence intensity, before and after the addition of agonists. The peak response was taken to be the characteristic value and was obtained by subtracting the peak value from the baseline (value before injection). Data obtained from this study were expressed as mean SEM. Statistical analysis was performed using the unpaired Student t test.

The following compounds have been tested including the reference compounds:
green Sichuan which is the extract of Sichuan pepper;
OH-sanshools (major compounds in Sichuan pepper responsible for the tingling and burning tastes);
synthetic analogues of α-hydroxy-sanshool A, B, C and D, the chemical formulae thereof are shown below;
C-Ala which is the carboxylic acid derivative of C coupled to alanine;
C-Gly which is the carboxylic acid derivative of C coupled to glycine;
C-Ser which is the carboxylic acid derivative of C coupled to Serine;
C-Glu which is the carboxylic acid derivative of C coupled to glutamic acid;
D-Ala being the carboxylic acid derivative of D condensed with alanine; and
Compounds J and K are two natural fatty acids, i.e., palmitoleic and linolenic acids coupled with alanine.

Figure 2:
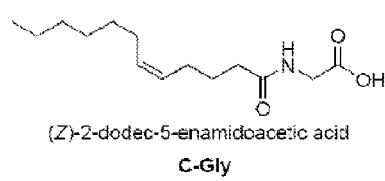
FIG. 2 shows the chemical structures of compounds used in the test experiments disclosed herein.
Figure 2:
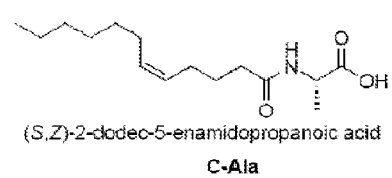
Figure 2:
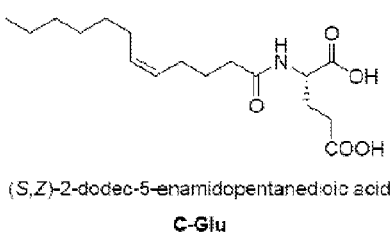
Figure 2:
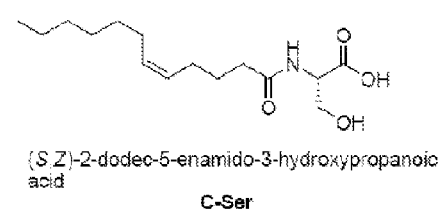
Figure 2:
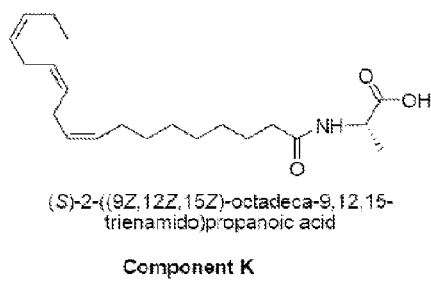
Figure 2:
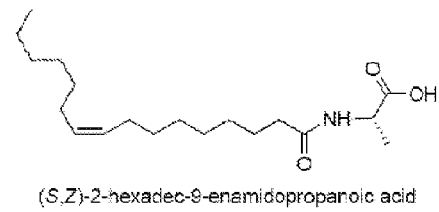
Figure 2:
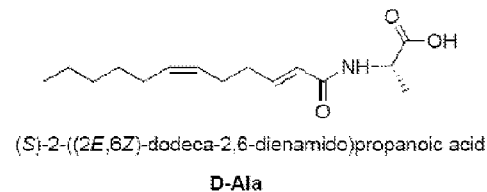

All these compounds are shown in FIG. 2.

Synthetic analogues A, B, C and D are derived from α-hydroxy-sanshool and have the following formulae:

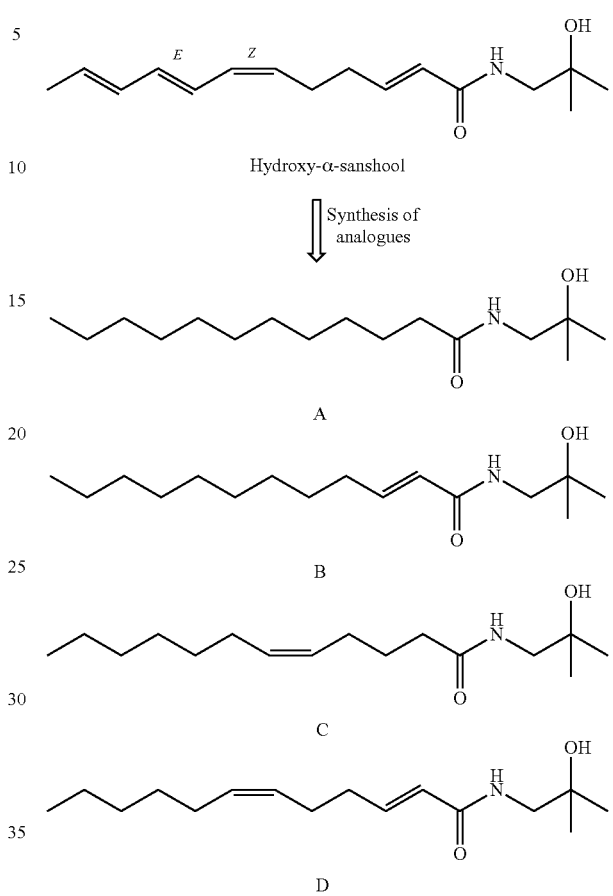

As can be seen from the maximum activation on TRPA1 and TRPV1 observed for saturating concentration of the compounds of the present invention, TRPA1 has been shown to be strongly stimulated while TRPV1 was purely activated. In particular, C-Ala, compounds J and K showed a strong stimulating effect on TRPA1, while C-Ala and K are purely activating TRPA1.

The compounds of the present invention can be synthesized following methods common in organic chemistry. A synthesis example is a coupling reaction using, as a starting material, a fatty acid and an amino acid to obtain the acylamino acid compound of the present invention. In a preferred embodiment, the coupling reaction is a condensation reaction. The fatty acids as well as the amino acid are selected from natural occurring or chemically modified fatty acids or amino acids.

The food preparation according to the present invention comprises an acylamino acid compound or a salt thereof in an amount sufficient to generate mainly tingling and not burning sensations in the oral cavity. In a preferred embodiment of the present invention, the food preparation comprises an acylamino acid compound having the following formula:

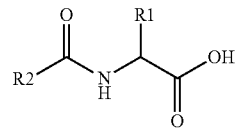

wherein R1 is selected from hydrogen, an alkyl group having 1 to 10 carbon atoms, a hydroxyalkyl group having 1 to 10 carbon atoms and a carboxyalkyl group having 1 to 10 carbon atoms and R2 is a straight chain hydrocarbon group having 5 to 20 carbon atoms and containing at least one double bond, or a salt thereof.

The content of the acylamino acid compound or a salt thereof in the food preparation is usually in a range of 10 micrograms to 500 milligrams per kilogram.

In the above formula, the alkyl group preferably comprises 1 to 5 carbon atoms, the hydroxyalkyl group comprises 1 to 5 carbon atoms, the carboxyalkyl group comprises 1 to 5 carbon atoms and the straight chain hydrocarbon group comprises 10 to 18 carbon atoms.

More preferred, in the above formula, the alkyl group preferably comprises 1 to 3 carbon atoms, the hydroxyalkyl group comprises 1 to 3 carbon atoms, the carboxyalkyl group comprises 1 to 3 carbon atoms and the straight chain hydrocarbon group comprises 11 to 17 carbon atoms.

In a particular preferred embodiment of the invention, the food preparation comprises an acylamino acid wherein, in the formula, R1 is selected from hydrogen, methyl, hydroxylethyl and carboxylethyl and the strain chain hydrocarbon group comprises 11 carbon atoms.

The compounds of the present invention are particularly applicable to food preparations which demand for a delicate hot sensation in the mouth cavity. Examples of food preparations are food additives, food products such as beverages, soups, ice-cream, confectionary, dairy, petfood and neutraceuticals.

In an alternative embodiment of the present invention, the acylamino acid "alpha-carboxyamide" compound is formed in situ from the condensation of fatty acids and amino acids available in the food preparation via thermal treatment followed by a basic hydrolysis and final neutralisation.

Such a condensation between an acid and an aminoacid may be carried out by using a thermal process such as heating in EtOH to about 100° C. for about 12 h (Indian Journal of Heterocyclic Chemistry 2004 14(1), 81-82); by using a microwaves process (10-12 min, about 150° C.) as described in Synthetic Communication 2008 38(7) 1028-1035; or by using enzymes such as amylase or acylase.

It has been shown that replacing the carboxyl terminus of the fatty acid by an amino acid potentiated dramatically the effect on TRPA1 and abolished the activity on TRPV1. The compounds of the present invention used in food preparations have been surprisingly shown to provide mainly tingling sensations in the mouth cavity without exhibiting the unpleasant accompanying burning sensation usually occurring with the extract of Sichuan pepper.

According to the invention, the acylamino acid compound or a salt thereof as presented above is used for generating a mainly tingling and not burning sensation in a food preparation. The compounds of the present invention are preferably used as a spice, flavour or seasoning.

The invention claimed is:

1. A food preparation comprising an acylamino acid compound or a salt thereof in an amount from 10 micrograms to 500 milligrams per kilogram of the food preparation, the acylamino acid compound selected from the group consisting of (S,Z)-2-dodec-5-enamidopropanoic acid, (Z)-2-dodec-5-enamidoacetic acid, (S)-2-((9Z,12Z,15Z)-octadeca-9,12,15 trienamido)propanoic acid, (S,Z)-2-hexadec-9-enamidopropanoic acid, (S)-2-((2E,6Z)-dodeca-2,6-dienamido)propanoic acid, and combinations thereof, the food preparation creates a tingling sensation and not a burning sensation in the oral cavity of an individual consuming the food preparation.

2. A method for manufacturing a food product, the method comprising using an acylamino acid compound or a salt thereof in an amount from 10 micrograms to 500 milligrams per kilogram of the food product, the acylamino acid compound selected from the group consisting of (S,Z)-2-dodec-5-enamidopropanoic acid, (Z)-2-dodec-5-enamidoacetic acid, (S)-2-((9Z,12Z,15Z)-octadeca-9,12,15 trienamido)propanoic acid, (S,Z)-2-hexadec-9-enamidopropanoic acid, (S)-2-((2E,6Z)-dodeca-2,6-dienamido)propanoic acid, and combinations thereof, the food product creates a tingling sensation and not a burning sensation in the oral cavity of an individual consuming the food product.

3. The method of claim 2, wherein the food product is selected from the group consisting of a spice, a flavour and a seasoning.

4. The food preparation of claim 1, wherein the acylamino acid compound is (S,Z)-2-dodec-5-enamidopropanoic acid.

5. The food preparation of claim 1, wherein the acylamino acid compound is (Z)-2-dodec-5-enamidoacetic acid.

6. The food preparation of claim 1, wherein the acylamino acid compound is (S)-2-((9Z,12Z,15Z)-octadeca-9,12,15 trienamido)propanoic acid.

7. The food preparation of claim 1, wherein the acylamino acid compound is (S,Z)-2-hexadec-9-enamidopropanoic acid.

8. The food preparation of claim 1, wherein the acylamino acid compound is (S)-2-((2E,6Z)-dodeca-2,6-dienamido)propanoic acid.

* * * * *